United States Patent
Jibbe et al.

(10) Patent No.: US 9,400,716 B2
(45) Date of Patent: Jul. 26, 2016

(54) METHOD FOR HANDLING INTERRUPTED WRITES USING MULTIPLE CORES

(71) Applicant: NetApp, Inc., Sunnyvale, CA (US)

(72) Inventors: Mahmoud K. Jibbe, Wichita, KS (US);
Senthil Kannan, RediyarPalayam (IN);
Selvaraj Rasappan, Tamil Nadu (IN)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 14/805,667

(22) Filed: Jul. 22, 2015

(65) Prior Publication Data

US 2015/0324263 A1    Nov. 12, 2015

Related U.S. Application Data

(62) Division of application No. 12/354,126, filed on Jan. 15, 2009, now abandoned.

(51) Int. Cl.
| | |
|---|---|
| *G06F 11/00* | (2006.01) |
| *G06F 11/10* | (2006.01) |
| *G06F 11/20* | (2006.01) |
| *G11B 20/18* | (2006.01) |

(52) U.S. Cl.
CPC ........ *G06F 11/1076* (2013.01); *G06F 11/1032* (2013.01); *G06F 11/2092* (2013.01); *G11B 20/1833* (2013.01); *G11B 2220/415* (2013.01)

(58) Field of Classification Search
CPC .............. G06F 11/1076; G06F 11/108; G06F 11/1084; G06F 11/1096; G06F 11/1612; G06F 11/1666; G06F 11/186; G06F 11/2005; G06F 11/2017; G06F 11/2033; G06F 11/2046; G06F 11/2053; G06F 11/2092; G06F 2201/85
See application file for complete search history.

(56) References Cited

U.S. PATENT DOCUMENTS

| | | | |
|---|---|---|---|
| 5,774,643 A | 6/1998 | Lubbers et al. | |
| 6,523,087 B2* | 2/2003 | Busser | G06F 11/1076 711/113 |
| 6,574,709 B1 | 6/2003 | Skazinski et al. | |
| 6,766,491 B2* | 7/2004 | Busser | G06F 11/2092 711/114 |
| 6,820,212 B2 | 11/2004 | Duchesne et al. | |
| 6,993,610 B2 | 1/2006 | Coffey et al. | |
| 7,058,848 B2 | 6/2006 | Sicola et al. | |
| 8,583,865 B1* | 11/2013 | Sade | G06F 11/108 711/103 |
| 2006/0206752 A1* | 9/2006 | Ikeuchi | G06F 11/1076 714/6.22 |
| 2008/0005614 A1 | 1/2008 | Lubbers et al. | |

* cited by examiner

*Primary Examiner* — Joseph Kudirka
(74) *Attorney, Agent, or Firm* — Haynes and Boone, LLP

(57) ABSTRACT

An apparatus including a storage array, a primary controller, a secondary controller and a solid state device. The storage array may be configured to be accessed by a plurality of controllers. A first of the plurality of the controllers may be configured as the primary controller configured to read and write to and from the storage array during a normal condition. A second of the plurality of the controllers may be configured as the secondary controller configured to read and write to and from the storage array during a fault condition. The solid state device may be configured to (i) store data and (ii) be accessed by the storage array and the secondary controller.

19 Claims, 6 Drawing Sheets

METHOD FOR HANDLING INTERRUPTED WRITES USING MULTIPLE CORES

CROSS REFERENCE TO RELATED APPLICATIONS

This application is a Divisional of U.S. Ser. No. 12/354,126, filed Jan. 15, 2009 entitled "Method for Handling Interrupted Writes Using Multiple Cores", the entire disclosure of which is incorporated herein by reference in its entirety.

FIELD OF THE INVENTION

The present invention relates to storage arrays generally and, more particularly, to a method and/or apparatus for responding to handling interrupted writes using multiple cores.

BACKGROUND OF THE INVENTION

Conventional systems address potential double fault conditions in a variety of ways. A conventional controller enters an NVSRAM interrupted write mode condition and the owning controller is rebooted by the test. Due to the controller reboot (i) the controller firmware will regenerate parity for the data stripe involved in a write, and (ii) a forced transfer to the surviving controller takes place.

The two conditions above cause the next N writes to be implemented using old/new data to generate a new parity bit. While performing the previous tasks associated with the next N write cycles, a data drive can fail unexpectedly in a volume group before the host retries the write. In such a condition, the controller does not know whether the write completed to the data drive and/or parity drive. If the write completes to the data drive, but does not complete to the parity drive, or vice versa, a potential data corruption will be detected due to the inconsistency between data and parity.

It would be desirable to implement a method and/or apparatus for handling interrupted writes using multiple cores that avoids data corruption.

SUMMARY OF THE INVENTION

The present invention concerns an apparatus comprising a storage array, a primary controller, a secondary controller and a solid state device. The storage array may be configured to be accessed by a plurality of controllers. A first of the plurality of the controllers may be configured as the primary controller configured to read and write to and from the storage array during a normal condition. A second of the plurality of the controllers may be configured as the secondary controller configured to read and write to and from the storage array during a fault condition. The solid state device may be configured to (i) store data and (ii) be accessed by the storage array and the secondary controller.

The objects, features and advantages of the present invention include providing a method and/or apparatus that may (i) have multiple cores to handle IO processing, (ii) have certain cores handle reconstruction and IO write process, (iii) have certain cores handle IO read process and stripe-set preservation (e.g., SSP and/or previous state preservation), (iv) have a nonvolatile RAM (e.g., a solid state drive) to store the data for SSP, (v) prevent data corruption when double faults occur, and/or (vi) provide performance enhancement with multiple cores handling next N writes by reading all stripes to generate new parity.

BRIEF DESCRIPTION OF THE DRAWINGS

These and other objects, features and advantages of the Present invention will be apparent from the following detailed description and the appended claims and drawings in which:

DETAILED DESCRIPTION OF THE PREFERRED EMBODIMENTS

Figure 1:
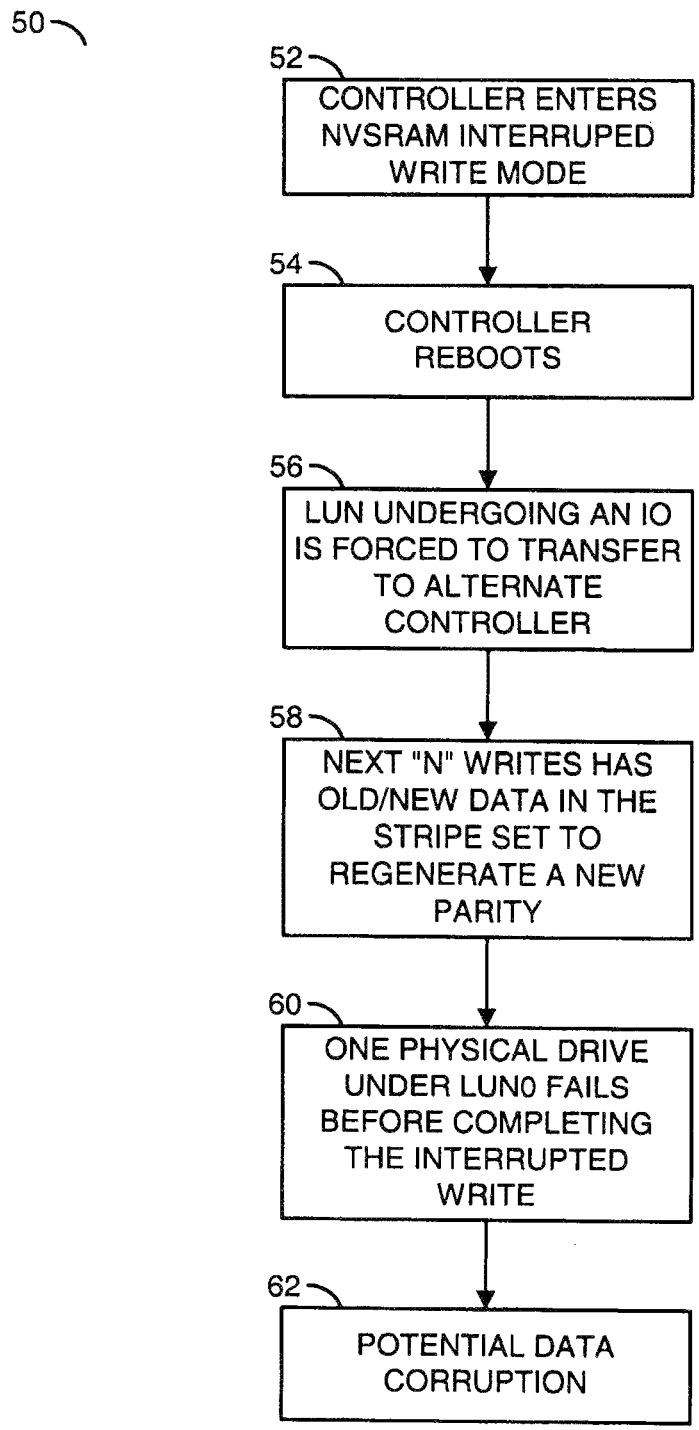
FIG. 1 is a flow diagram illustrating a double fault condition.

Referring to FIG. 1, a flow diagram of a process 50 is shown illustrating a double fault condition. The process 50 generally comprises a state 52, a state 54, a state 56, a state 58, a state 60, and a state 62. In the state 52, a controller enters an NVSRAM interrupted write mode. In the state 54, the controller reboots. In the state 56, a LUN undergoing an input/output (IO) is forced to transfer to an alternate controller. In the state 58, subsequent write operations have old/new data in the stripe set to regenerate a new parity. In the state 60, one of the physical drives under the LUN0 fails before completing the interrupted write. In the state 62, a potential data corruption state occurs.

Figure 2:
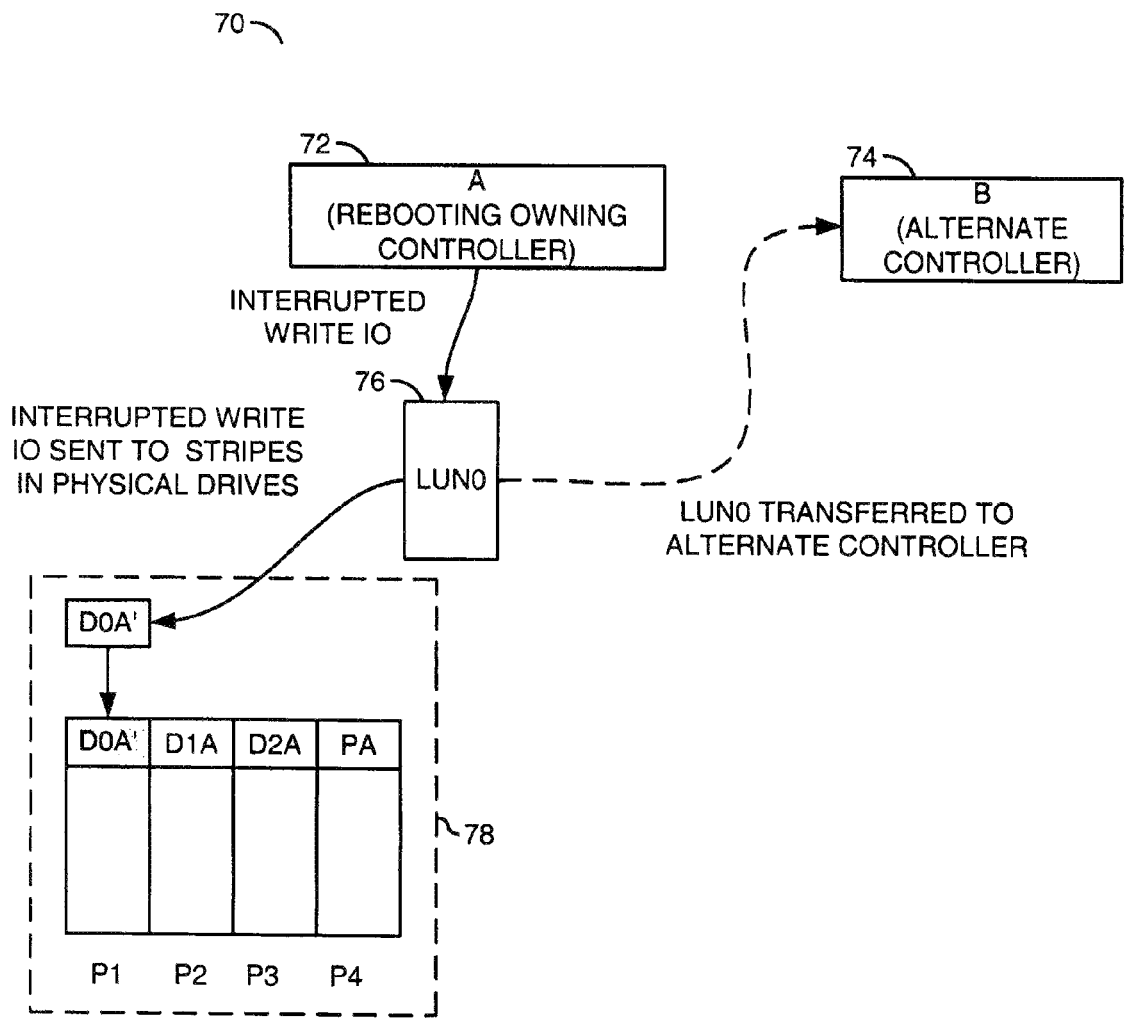
FIG. 2 is a block diagram of a double fault condition.

Referring to FIG. 2, a block diagram of a system 70 is shown illustrating a double fault condition. The system 70 generally comprises a block 72, a block 74, a block 76, and a block 78. The block 72 may be implemented as a controller (e.g., controller A). The block 74 may be implemented as a controller (e.g., controller B). The block 76 may be implemented as a LUN0. The block 78 may be implemented as a drive array. The system 70 may operate in a number of states as shown in the following TABLE 1:

TABLE 1

| STATE | ACTION |
| --- | --- |
| 1 | Controller A and Controller B |
| 2 | LUN0 created on top of physical drives |
| 3 | Stripe Set A used to generate parity PA |
| 4 | State 3 located on the Stripe Set A location of LUN0 |
| 5 | Write IO sent to LUN0 |
| 6 | DOA' written to P1, Controller A reboots |
| 7 | Forced transfer of LUN0 to Controller B |
| 8 | Pending write and the next "n" writes involve generation of parity PA' by reading all strip segments |
| 9 | Controller B regenerates parity PA' for stripe set A having an interrupted write mode |
| 10 | Controller B reads new data and old data to generate parity PA' |
| 11 | P2 fails during step 10 |
| 12 | If state 11 occurs, regeneration of data for P2 results in wrong data |
| 13 | Data corruption for next "x" writes due to state 11 |

In the state 1 of TABLE 1, the controller A is implemented as an owning controller for the LUN0 76. The controller B is implemented as an alternate controller. The controller B is in a passive state and implemented for redundancy. In the state 2 of TABLE 1, the LUN0 76 is created on top of the drive array 78. In one example, the drive array 78 is implemented as four physical drives (or disks) (e.g., P1, P2, P3, P4). However, the particular number of drives may be varied to meet the design criteria of a particular implementation. In the state 3 of TABLE 1, a number of data segments D0A, D1A, D2A are implemented in a stripe set (e.g., A) which is used to generate a parity (e.g., PA). In the state 4 of TABLE 1, the state 3 is located on the stripe set A location of the LUN0 76 created in state 2. In the state 5 of TABLE 1, the controller A sends a write IO (e.g., the data segment D0A') to the LUN0 76. In the state 6 of TABLE 1, the data D0A' is written in a first disk (e.g., P1) of the drive array 78. Before regenerating and writing a parity (e.g., PA') to a fourth disk (e.g., P4), the controller A reboots. In the state 7 of TABLE 1, a forced transfer of the LUN0 76 to the controller B (e.g., the alternate controller) happens. In the state 8 of TABLE 1, the action of the state 7 triggers the pending write and the next "N" writes to involve generation of the parity PA' by reading all data segments (whether the LUN0 76 has old/new data).

In one example, a scenario may be considered where the controller B tries to regenerate the parity PA' for the stripe set A, which has an interrupted write mode (e.g., the state 9). In the state 10 of TABLE 1, the controller B reads new data (e.g., D0A' from the first disk), old data (e.g., D1A from the second disk) and old data (e.g., D2A from the third disk) to generate the parity PA' as new parity in place of the parity PA (from the fourth disk). If the second disk fails during the state 10, one new data and old parity results (the state 11 of TABLE 1). In the state 11 scenario (e.g., the second disk fails), regenerating data for the second disk will result in wrong data since one new data and the parity PA that was not generated using the new data stripes is used. In the State 13 of TABLE 1, data corruption occurs for the next 'x' writes due to the second disk failing.

Figure 3:
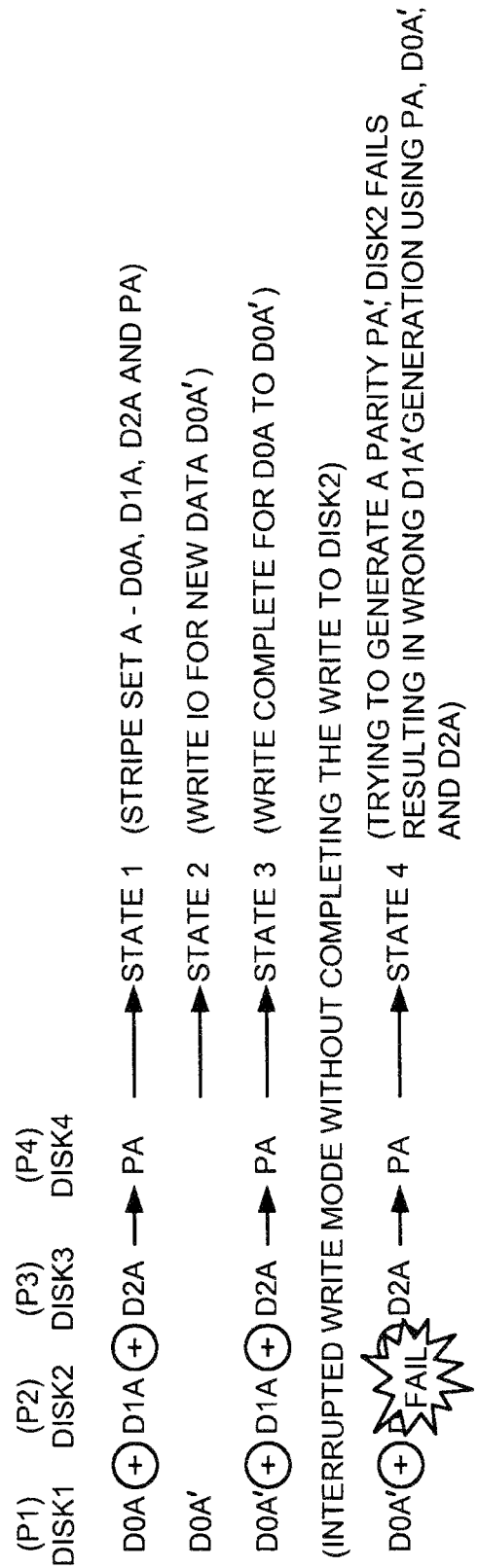
FIG. 3 is a conceptual diagram of a double fault condition.

Referring to FIG. 3, a conceptual diagram of a double fault condition of the system 70 is shown. In the STATE 1, the stripe set A (e.g., D0A, D1A, D2A, and PA) is stored in the physical drives (e.g., P1, P2, P3, and P4) of the drive array 78. In the STATE 2, a write IO is sent for a new data (e.g., D0A') to be written to the first disk (e.g., P1). In the STATE 3, the write IO is completed for the data D0A'. After the write IO has completed in the STATE 3, an interrupted write mode occurs (e.g., a first fault) without completing the write to the second disk (e.g., P2). In the STATE 4, while trying to generate the new parity PA', the second disk (e.g., P2) fails (e.g., a second fault) resulting in the wrong generation of D1A' using the parity PA with the data D0A' and the data D2A. The system 70 may experience both the first fault and the second fault (e.g., the double fault condition).

Figure 4:
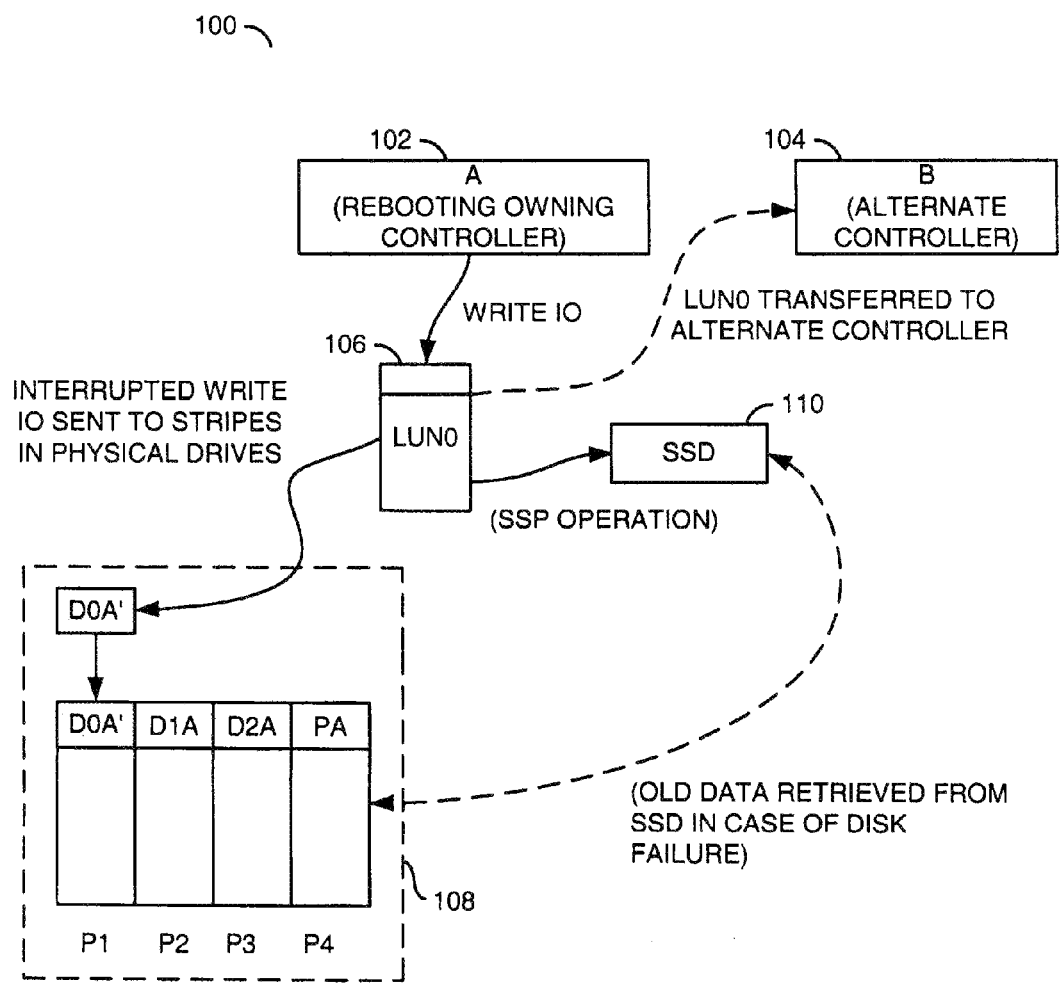
FIG. 4 is a block diagram of an example embodiment of the present invention.

Referring to FIG. 4, a block diagram of the system 100 is shown. The system generally comprises a module 102, a module 104, a module 106, a module 108, and a module 110. The module 102 may be implemented as a controller (e.g., controller A). The module 104 may be implemented as a controller (e.g., controller B). The module 106 may be implemented as a LUN0. The module 108 may be implemented as a storage array. For example, the module 108 may represent an array of disk drives or other storage devices (e.g., solid state storage, etc.). The modules 102, 104 and 106 may be implemented as hardware, software, a combination of hardware and software, or other implementations. The module 110 may be implemented as a storage device. In one example, the storage device 110 may be implemented as a solid state drive (or device). The system 100 may be implemented in a number of states as shown in the following TABLE 2:

TABLE 2

| STATE | ACTION |
| --- | --- |
| 1 | Controller A and Controller B |
| 2 | LUN0 created on top of physical drives |
| 3 | Stripe Set A used to generate parity PA |
| 4 | State 3 located on the stripe set A location of LUN0 |
| 5 | Write IO sent to LUN0 |
| 6 | Stripe-set State Preservation of data |
| 7 | D0A' written to P1, Controller A reboots |
| 8 | Forced transfer of LUN0 to Controller B |
| 9 | Pending write and the next "n" writes involve generation of parity PA' by reading all strip segments |
| 10 | Controller B regenerates parity PA' for stripe set A having an interrupted write mode |
| 11 | Controller B reads new data and old data to generate parity PA' |
| 12 | P2 fails during step 11 |
| 13 | If state 12 occurs, D1A generated/read from SSP |
| 14 | Data stored in state 6 is erased |

In the state 1 of TABLE 2, the controller A may be implemented as an owning controller for the LUN0 106 (e.g., during a normal condition). The controller B may be implemented as an alternate controller. The controller B may be in a passive state and may be implemented for redundancy. In the state 2 of TABLE 2, the LUN0 106 may be created on top of the drive array 108. IO requests are normally sent to the LUN0 106, which translates such requests to the storage devices in the storage array 108. While one LUN0 is shown, a number of LUNs may be implemented (e.g., up to 2048 or more) in a particular design. In the example shown, the storage array 108 may be implemented as four physical drives (or disks) (e.g., P1, P2, P3, P4). However, the particular number of drives may be varied to meet the design criteria of a particular implementation. In the state 3 of TABLE 2, a number of data segments D0A, D1A, D2A may be implemented in a stripe set (e.g., A) which is normally used to generate a parity (e.g., PA). In the state 4 of TABLE 2, the state 3 may be located on the stripe set A location of the LUN0 106 created in the state 2. In the state 5 of TABLE 2, the controller A may send a write IO (e.g., the data segment D0A') to the LUN0 106.

In the state 6 of TABLE 2, the system 100 may implement a Stripe-set State Preservation (SSP). In an SSP, the previous state of the stripe set A (e.g., D0A, D1A, D2A and PA) may be stored by the storage device 110. In one example, the previous state of the stripe set A may be stored before the stripe set A is written to the LUN0 106. Corresponding mappings may be maintained by the controller B. In one example, the stripe set having the data segment to be written may be read and stored in the storage device 110 for each write IO request. In the state 7 of TABLE 2, the data segment D0A' may be written in a first disk (e.g., P1) of the drive array 108. Before regenerating and writing a parity (e.g., PA') to a fourth disk (e.g., P4), the controller A may reboot (e.g., a fault condition). In one example, the controller B may not be sure that the state 7 has completed correctly (e.g., an incomplete write, a recovered error state, etc.). The controller B may retry the write with the new data in cache and make sure it is written to the first disk before generating the parity PA'. In the state 8 of TABLE 2, a forced transfer of the LUN0 106 to the controller B (e.g., the alternate controller) may happen. In the state 9 of TABLE 2, the state 8 may trigger the pending write and the next "N" writes to generate the parity PA' by reading all stripe segments (whether the LUN0 106 has old/new data).

In one example, a scenario may be considered where the controller B tries to regenerate the parity PA' for the stripe set A, which may have an interrupted write mode (e.g., the state 10 of TABLE 2). In the state 11 of TABLE 2, the controller B may read new data (e.g., D0A' from the first disk), old data (e.g., D1A from the second disk) and old data (e.g., D2A from the third disk) to generate the parity PA' as new parity in place of the parity PA (e.g. from the fourth disk). In the state 12 of TABLE 2, the second disk may fail in the state 11. If the second disk fails, one new data and the old parity may result. Regenerating data for the second disk may not be done with a present stripe-set state. The data D1A (stored in the state 6) may be generated or read from the storage device 110 (the state 13). The storage device 110 may generate the data D1A. The LUN0 106 may use the data D0A', D1A, D2A to regenerate the parity PA'. In the state 14 of TABLE 2, the data stored in the storage device 110 during the state 6 may be erased.

The system 100 may involve multiple cores (or controllers). Based on design implementation, certain cores (e.g., write cores) may handle data reconstruction and IO write operations while other cores (e.g., read cores) may focus on read operations. In one example, the read cores may handle the Stripe-set State Preservation (SSP). For example, the SSP may involve reading an entire data segment in the stripe set (e.g., for a write operation) before the write operation begins. The data segment to be written may be read by the read cores in response to each write IO request. The data segment may also be stored in the storage device 110 (e.g., a NVRAM, solid state drive, etc.). The corresponding data state with respect to the LUN0 106 may be mapped and maintained in a separate table by the controller B. The system 100 may prevent possible data corruption.

Figure 5:
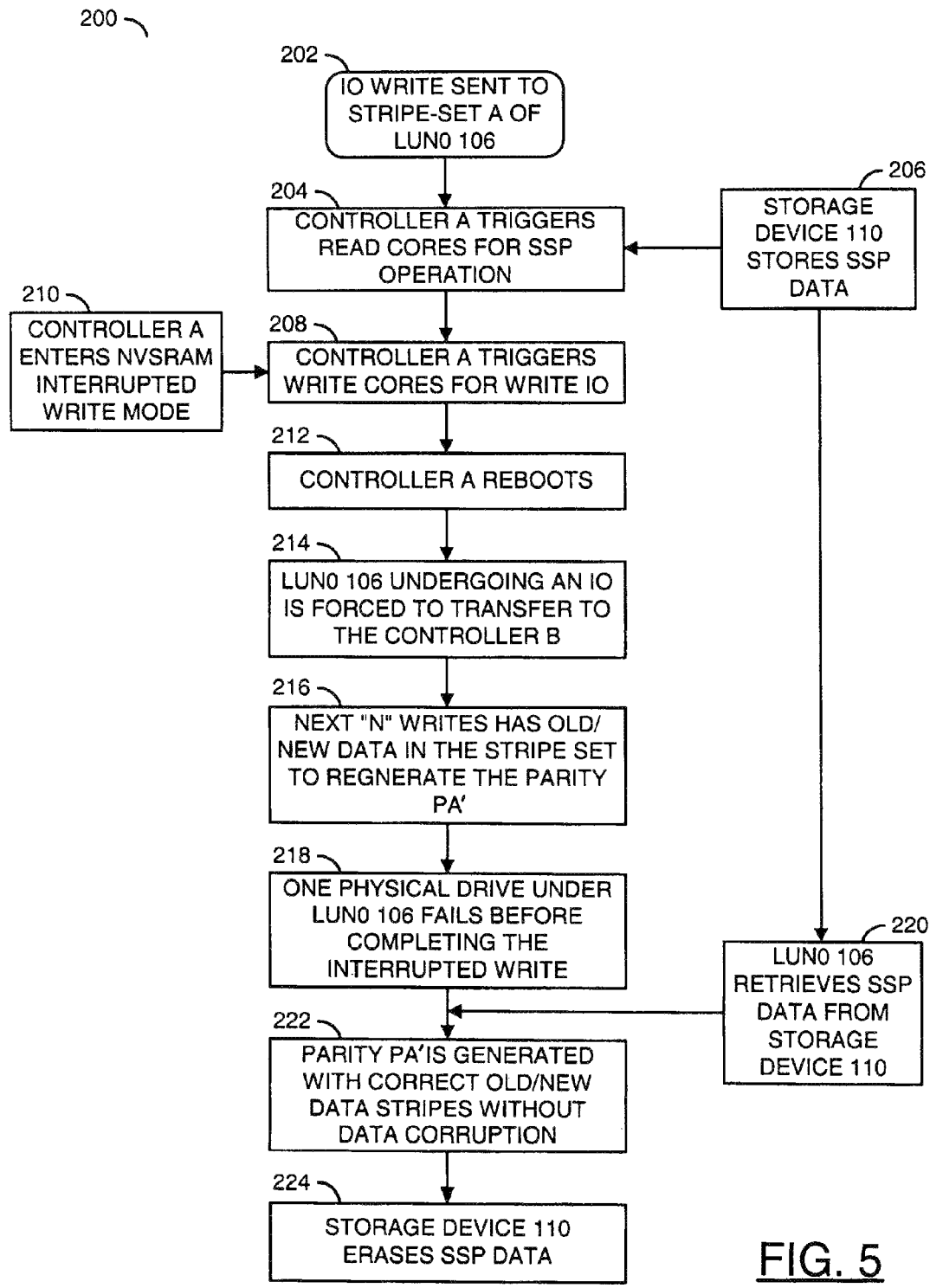
FIG. 5 is a flow diagram illustrating an example embodiment of the present invention.

Referring to FIG. 5, a flow diagram of the process 200 is shown illustrating an example embodiment of the present invention. The process 200 generally comprises a state 202, a state 204, a state 206, a state 208, a state 210, a state 212, a state 214, a state 216, a state 218, a state 220, a state 222, and state 224. In the state 202, a write IO may be sent to a stripe set A of the LUN0 106. In the state 204, the controller A may trigger the read cores for a Stripe-set State Preservation (SSP) operation. In the state 206, the storage device 110 may store the SSP data. In the state 208, the controller A may trigger the write cores for a 10 write. In the state 210, the controller A may enter a nonvolatile SRAM interrupted write mode. In the state 212, the controller A may reboot. In the state 214, the LUND 106 undergoing an IO may be forced to transfer to the controller B (e.g., an alternate controller). In the state 216, the next "N" writes may have old/new data in the stripe set A to regenerate the parity PA'. In the state 218, one physical drive under the LUN0 106 may fail before completion of the interrupted write. In the state 220, the LUN0 106 may retrieve the SSP data from the storage device 110. In the state 222, the parity PA' may be generated with correct old/new data stripes and may avoid data corruption. In the step 224, the storage device 110 may erase the SSP data.

Figure 6:
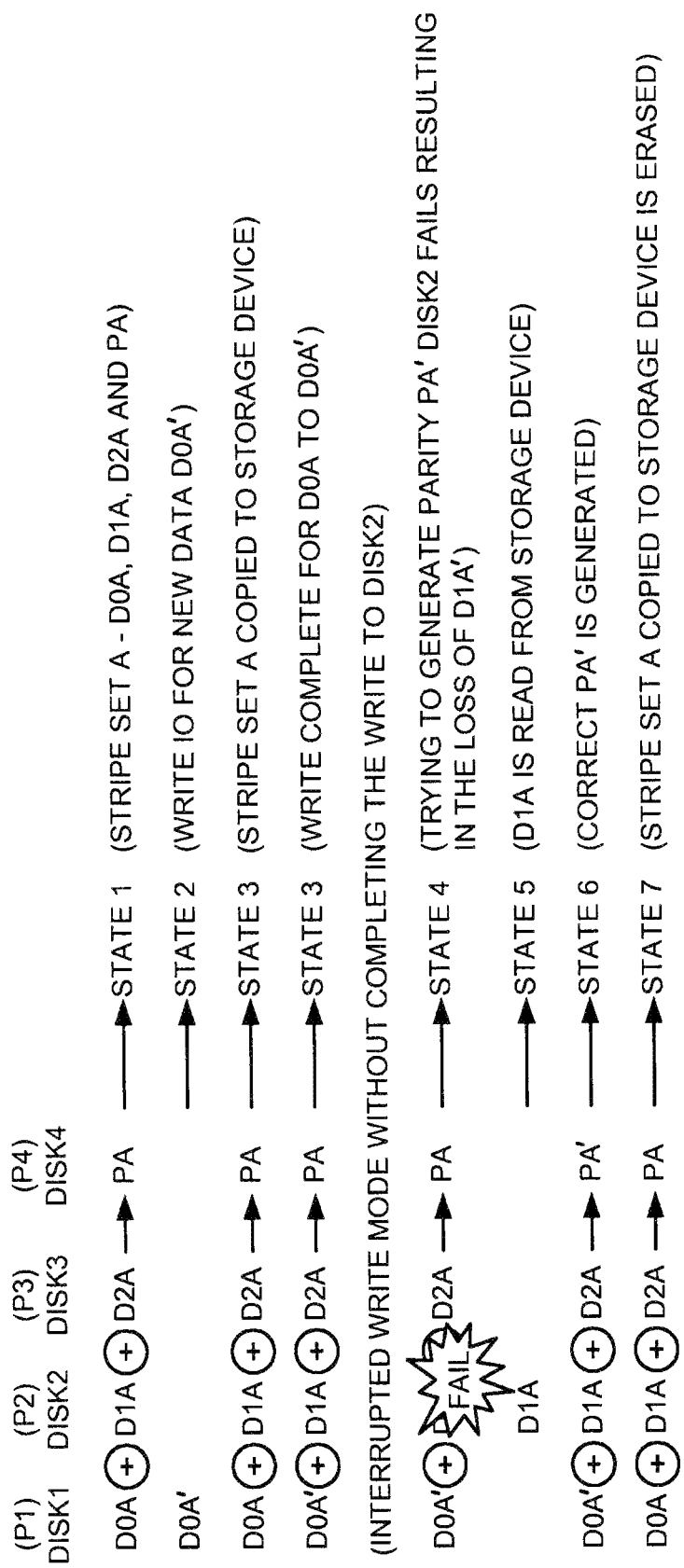
FIG. 6 is a conceptual diagram of an example embodiment of the present invention.

Referring to FIG. 6, a conceptual diagram of Stripe-set State Preservation by the system 100 is shown. In the STATE 1, the stripe set A (e.g., a data block D0A, a data block D1A, a data block D2A, and a parity block PA) may be shown written to the drive array 108. The data block D0A may represent a single data block or a plurality of data blocks. The data blocks D1A and D2A, as well as the parity block PA, may each represent one or more data blocks. In the STATE 2, a write IO may be sent for a new data block (e.g., D0A'). In the STATE 3, the stripe set A may be written to the storage device 110. The write operation for the data block D0A' may be completed in the STATE 3. After the STATE 3, an interrupted write mode may occur without completing the write to the second disk (e.g., P2). While the LUN0 106 may try to generate the parity PA' in the STATE 4, the write operation to the second disk (e.g., P2) may fail. The failure of the write to the second disk may result in the loss of the data block D1A. In the STATE 5, the data block D1A may be read from the storage device 110. In the STATE 6, the parity block PA' may be generated. In the STATE 7, the stripe Set A (stored in the STATE 3) may be erased. The STATES 1-7 generally describe different states used to implement a read modify/write implementation. In general, the symbol "+" in FIG. 6 represents an exclusive OR.

The system 100 may handle interrupted write modes using dual cores. For example, one or more cores may handle the IO thread for write and one or more cores may handle the IO thread for reading the old data in the stripe set where the write is intended to be performed. The old data read (e.g., by the read cores) may be stored in the storage device 110 (e.g., a NVRAM) and the controller B may map the old data with respect to the stripe set location. Data corruptions may be prevented during a double fault situation where a NVSRAM interrupted write mode condition happens within the controller (e.g., the owning controller A is rebooted) and one of the hard disk drives fails.

As used herein, the term "NVSRAM interrupted write mode" is meant to describe the condition where a controller is in the middle of writing IO to a series of drives (or storage devices) and the controller hits an exception (e.g., a reboot, failed state, etc.) thus interrupting the write sequence to a particular stripe set.

While the invention has been particularly shown and described with reference to the preferred embodiments thereof, it will be understood by those skilled in the art that various changes in form and details may be made without departing from the scope of the invention.

The invention claimed is:

1. A method comprising:
    while acting as a redundant controller for a Logical Unit (LUN) on a storage array, maintaining information mapping a data state of a data stripe associated with the LUN, wherein the data stripe is stored in a storage device that is different from the storage array also storing the data stripe;
    taking over ownership of the LUN in response to a failure of a storage controller;
    reading a first segment of the data stripe from the storage array and reading a second segment of the data stripe from the storage device, wherein the first segment of the data stripe has new data, and further wherein the second segment of the data stripe has old data, wherein reading the second segment of the data stripe is performed in response to a hardware failure of the storage array; and
    generating a parity segment for the data stripe from the first segment and the second segment.

2. The method of claim 1, wherein the hardware failure of the storage array comprises a single storage drive failure.

3. The method of claim 1, further comprising in response to taking over the LUN, attempting a write operation with the new data to the storage array to make sure the new data is written to the storage array before generating the parity segment.

4. The method of claim 1, wherein failure of the storage controller occurs during an input/output operation to write the new data to the data stripe.

5. The method of claim 1, further comprising:
    after generating the parity segment, erasing the data stripe stored in the storage device.

6. The method of claim 1, wherein the method is performed by an alternate storage controller in communication with the storage array and the storage device.

7. The method of claim 1, wherein taking over ownership of the LUN comprises a forced takeover of ownership of the LUN from the storage controller to an alternate storage controller.

8. The method of claim 1, wherein taking over ownership of the LUN is performed in response to a reboot of the storage controller.

9. The method of claim 1, wherein the storage array comprises a plurality of disk drives, and further wherein the storage device comprises a Solid State Drive (SSD).

10. A computing device comprising:
a memory containing machine readable medium comprising machine executable code having stored thereon instructions for performing a method of handling an interrupted write operation; and
a processor coupled to the memory, the processor configured to execute the machine executable code to:
maintain a passive state during a normal operation of a storage system, wherein the storage system includes an array of storage drives and a storage device separate from the array, further wherein a Logical Unit (LUN) is implemented on top of the array;
take over ownership of the LUN in response to a fault condition of a primary controller of the storage system and during a write operation associated with the primary controller;
attempt to generate a parity stripe segment using new data and old data, wherein the new data is associated with the write operation;
in response to a hardware failure of the storage array during attempting to generate the parity stripe segment, read the new data from the array of storage drives and reading the old data from the storage device; and
generate the parity stripe segment using the old data and the new data.

11. The computing device of claim 10, wherein the computing device comprises an alternate controller in communication with the array of storage drives.

12. The computing device of claim 10, wherein the fault condition of the primary controller comprises a reboot of the primary controller.

13. The computing device of claim 10, further wherein the processor is configured to execute the machine readable code to:
in response to taking over ownership of the LUN, attempt a write operation with the new data to the array to make sure the new data is written to the array before generating the parity stripe segment.

14. The computing device of claim 10, further wherein the processor is configured to execute the machine readable code to:
maintain information mapping a data state of a data stripe associated with the LUN during the passive state.

15. The computing device of claim 10, wherein the array comprises a plurality of disk drives, and further wherein the storage device comprises a nonvolatile random access memory.

16. The computing device of claim 10, further wherein the processor is configured to execute the machine readable code to:
erase the old data from the storage device after generating the parity stripe segment.

17. A non-transitory machine readable medium having stored thereon instructions for performing a method of handling an interrupted write operation, comprising machine executable code which when executed by at least one machine, causes the machine to:
maintain a passive mode for redundancy of control of a storage array, wherein a Logical Unit (LUN) is implemented on top of the storage array, wherein a storage system including the storage array further includes a nonvolatile storage device separate from the storage array;
take over ownership of the LUN from a primary storage controller in response to a failure mode of the primary storage controller and during the interrupted write operation; and
generate parity data from old data and from new data written as a result of the interrupted write operation, wherein generating the parity data includes reading the new data from the storage array and reading the old data from the storage device in response to a hardware failure of the storage array.

18. The non-transitory machine-readable medium of claim 17, wherein the machine executable code further causes the machine to:
erase the old data from the storage device after generating the parity data.

19. The non-transitory machine-readable medium of claim 17, wherein the failure mode of the primary storage controller comprises a reboot of the primary storage controller.

* * * * *